UNITED STATES PATENT OFFICE.

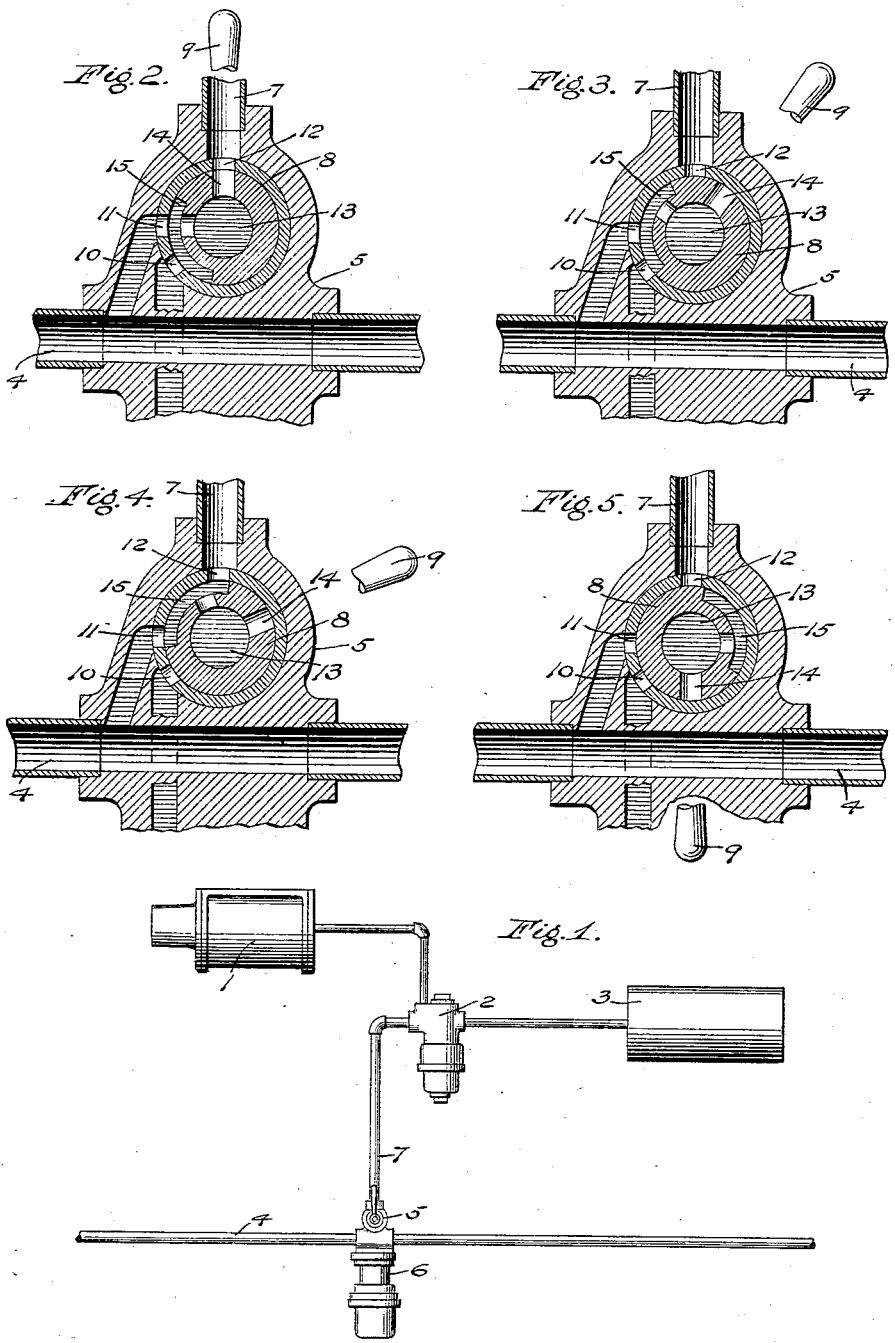

HENRY H. WESTINGHOUSE, OF NEW YORK, N. Y., ASSIGNOR TO THE WESTINGHOUSE AIR BRAKE COMPANY, OF PITTSBURG, PENNSYLVANIA, A CORPORATION OF PENNSYLVANIA.

COCK FOR AIR-BRAKES.

977,242.     Specification of Letters Patent.     Patented Nov. 29, 1910.

Application filed March 16, 1909. Serial No. 483,818.

*To all whom it may concern:*

Be it known that I, HENRY H. WESTINGHOUSE, a citizen of the United States, residing at New York, in the county of New York and State of New York, have invented new and useful Improvements in Cocks for Air-Brakes, of which the following is a specification.

This invention relates to fluid pressure brakes, and more particularly to a cut out cock device.

The principal object of my improvement is to provide a device of the above character in connection with a car air brake equipment in which a separate quick action train pipe vent valve device is employed, and the improved cock is adapted to cut out of action either the vent valve, or the triple valve device, or both.

According to the drawing; Figure 1 is a diagrammatic view illustrating a car brake apparatus with my improvement applied thereto; and Figs. 2 to 5 inclusive, sectional views of the improved cut out cock in the respective positions as follows, vent valve and triple valve device cut in, vent valve cut in and triple valve cut out, vent valve cut out and triple valve cut in, and vent valve and triple valve cut out.

The car brake apparatus shown in Fig. 1 comprises the usual brake cylinder 1, triple valve device 2, auxiliary reservoir 3, and train pipe 4 connected up in the usual manner. In its preferred form the improved cut out cock device 5 is constructed as a part of the vent valve device 6 and is located at the juncture of the triple valve branch pipe 7 and the train pipe 4, the vent valve device being of any desired type adapted to be operated upon a sudden reduction in train pipe pressure for venting air from the train pipe.

As shown in Figs. 2 to 5 inclusive, the cut out cock 5 comprises a plug cock 8 having an operating handle 9, the seat of which is provided with ports 10, 11, and 12 leading respectively to the vent valve device 6, the train pipe 4, and the branch pipe 7. The plug cock 8 is provided with a central cavity 13 having a port 14, and a cavity 15 opening thereto.

In the position of parts shown in Fig. 2, the cavity 15 connects ports 10 and 11 and port 14 registers with port 12, so that the vent valve 6 and triple valve device are connected to the train pipe.

When the handle 9 is turned to the position shown in Fig. 3, the port 12 is closed, but the cavity 15 still connects ports 10 and 11, therefore the vent valve remains in operation while the triple valve device is cut out of action. Fig. 4 illustrates the parts in position for cutting out the vent valve, the triple valve being cut in through the connection of port 11 with port 12 by the cavity 15.

In Fig. 5 both the triple valve port 12 and vent valve port 10 are lapped and the triple valve device as well as the vent valve are then cut out of action. It will thus be evident that by this construction either the triple valve device, or the vent valve, or both triple valve device and vent valve may be cut out of action.

Having now described my invention, what I claim as new and desire to secure by Letters Patent, is:—

1. The combination with a train pipe vent valve, a triple valve device, and train pipe, of a cut-out cock having positions for cutting either the triple valve or the vent valve out of action.

2. The combination with a train pipe vent valve, a triple valve device, and train pipe, of a cut-out cock having positions for respectively cutting out either the triple valve device, or the vent valve, or both.

3. The combination with a train pipe vent valve, a triple valve device, and train pipe, of a cut-out cock normally connecting the train pipe to the triple valve device and to the vent valve and having other positions for respectively cutting out the triple valve device, the vent valve, and both triple valve device and vent valve.

4. The combination with a train pipe vent valve, a triple valve device, and train pipe, of a cut-out cock located at the juncture of the triple valve branch pipe and train pipe for controlling communication from the train pipe to the triple valve device and from the train pipe to the vent valve.

5. The combination with a train pipe vent valve, a triple valve device, and train pipe, of a cut-out cock located at the juncture of the triple valve branch pipe and train pipe and having one position for cutting the triple valve device out of action and another position for cutting the vent valve out of action.

In testimony whereof I have hereunto set my hand.

HENRY H. WESTINGHOUSE.

Witnesses:
  WM. M. CADY,
  A. M. CLEMENTS.